United States Patent Office 3,160,805
Patented Dec. 8, 1964

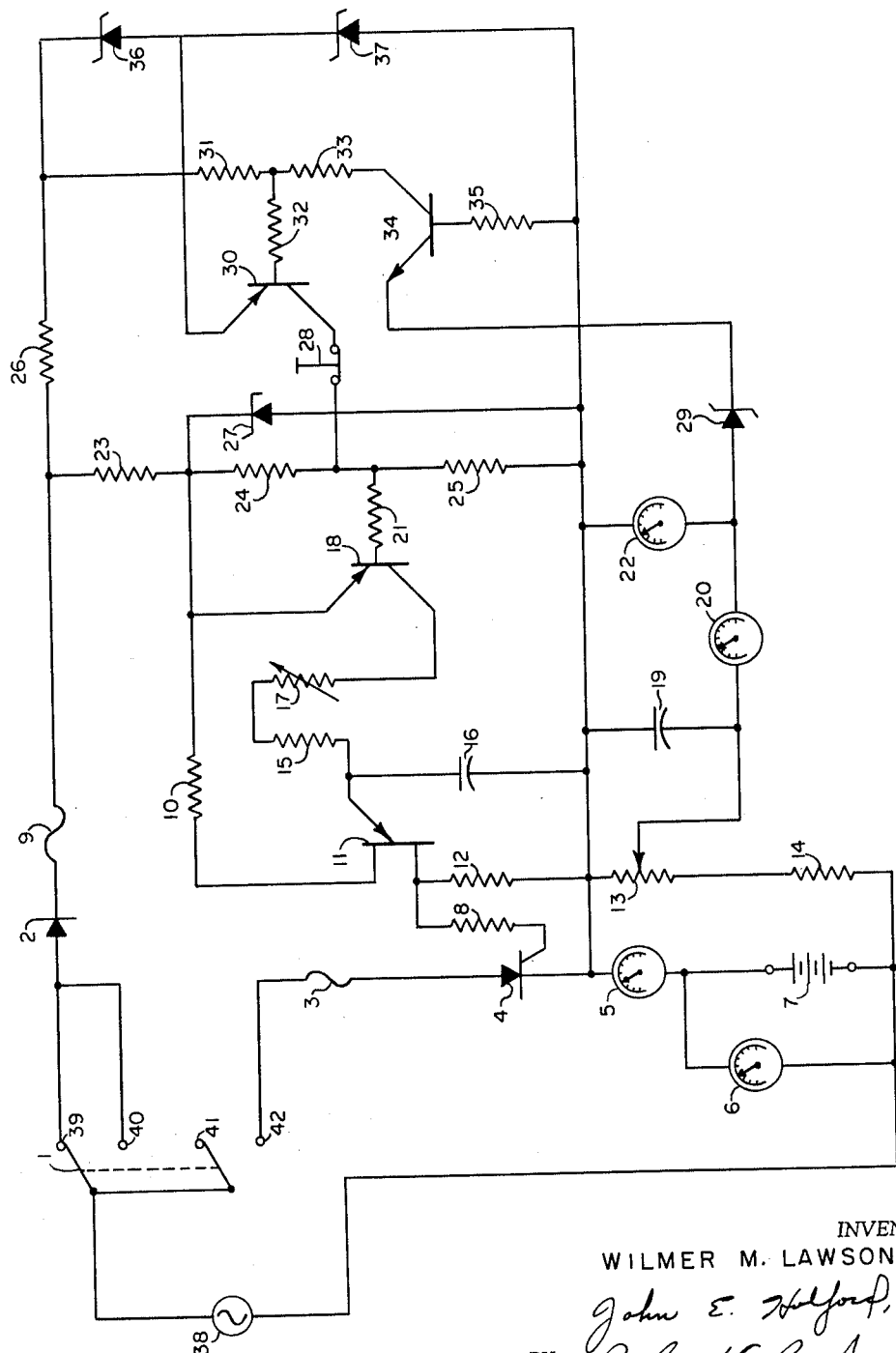

3,160,805
BATTERY CHARGER
Wilmer M. Lawson, Jr., College Park, Md., assignor to the United States of America as represented by the Secretary of the Navy
Filed Dec. 28, 1960, Ser. No. 79,083
5 Claims. (Cl. 320—39)
(Granted under Title 35, U.S. Code (1952), sec. 266)

The invention described herein may be manufactured and used by or for the Government of the United States of America for governmental purposes without the payment of any royalties thereon or therefor.

The present invention relates to battery chargers, and more specifically to battery chargers with an over-voltage trip to prevent the voltage at the battery terminals from exceeding a preselected value.

In certain types of storage batteries such as for example those having an electrolyte sealed therein, the recharging potential is a very critical factor. If the potential is maintained above the critical level the battery electrodes polarize, thereby causing the generation of gas within the battery cells. Not only does this degenerate the electrolyte, but the gas pressure developed can rupture the battery scattering electrolyte on equipment and personnel in the immediate area.

It has been customary, therefore, to limit the output of these chargers either to a constant preset voltage or a constant current. The constant potential charger works well until the battery reaches about 75% of its charge capacity. The long charging time required to reach capacity beyond this point makes this type of charger undesirable for most applications. The constant current chargers have employed trip circuits which suddenly interrupt the charging process when the voltage exceeds a preset value. Resetting the trip relay automatically is difficult and the time required for charging is considerably longer than the ideal case, i.e., when the proper charging rate is employed at all times.

An object of the present invention is therefore to provide a battery charger which will charge a battery as quickly as possible and yet not exceed the maximum safe charging potential of the battery.

A further object of the invention is to provide a battery charger of the type described above which employs a novel combination of transistors in order to increase the efficiency and compactness of the unit.

These and other objects of the invention are best understood with reference to the accompanying drawing wherein:

The sole figure of the drawing shows a circuit diagram of the invention.

Referring to the figure there is shown, an embodiment of the invention. The charger unit is designed to operate from a 60 cycle source 38 of 110 volts which is most frequently encountered in practice. It will be recognized, however, that other voltages and frequencies can be used with minor circuit changes. When switch 1 is in the operate position, the battery 7, which is to be charged, receives current through an NPNP transistor or silicon controlled rectified 4, as for example a type C35FSCR. The current through the rectifier 4 is controlled by pulses from timing circuit including the PN junction transistor 11, to be described presently. A fuse 3 of appropriate size, for example 20 amperes, is used to protect the battery and rectifier.

The D.C. supply for this timing circuit may be obtained, for example, through a 500 milliampere rectifier 2 and a quarter ampere fuse 9 of the type commonly employed in power supplies for home radios and televisions. The supply voltage is developed at the emitter of a variable impedance transistor 18 in the timing circuit from a tap on a voltage divider composed of a current limiting resistor 23, a 24 volt zener diode 27 and the battery 7. A regulated voltage divider consisting of dropping resistors 24 and 25 shunts the high impedance of the diode 27 at voltages below the breakdown potential. The relatively large value of these dropping resistors in the voltage divider, compared to resistor 23, provide a fairly rapid voltage buildup, at the begining of each positive half cycle, while the diode 27 provides a substantially square waveform to the remainder of the same half cycle.

In addition to the regulated voltage divider the square supply waveform is applied to the supply terminal of the transistor 11, through a limiting resistor 10, and an RC network supplying a bias voltage to the emitter of the same transistor. The output electrode of transistor 11 is connected to the common current return at the positive terminal of battery 7 by means of a small discharge resistor 12. An even smaller resistor 8 supplies control current from the output electrode to the silicon controlled rectifier 4.

The RC network delays the output pulse from unijunction transistor 11 for a time after the beginning of each positive input half cycle. To provide an initial adjustment the button 28 is assumed to be depressed. The relative values of resistors 24 and 25 then determine a value of bias which in turn provides a nominal impedance betwen the emitter and collector of transistor 18. Resistor 15 and capacitor 16 are given relative values to provide the minimum useful delay. The maximum value of the variable resistor 17 may conveniently be chosen to provide enough additional resistance to delay the output pulse from transistor 11 until the end of the positive half cycle. Since the average current supplied by the Thyratron-like transistor 4 depends on length of each conduction cycle, resistor 17 may be used to adjust the initial value of charging current. Capactior 16 discharges through resistor 12 when the rectifier 4 conducts.

Assuming the button 28 is again in its normal closed position, a battery potential sensing circuit including transistors 30 and 34 operates to control the bias current to transistor 18 to further adjust the impedance thereof. D.C. current to operate these voltage sensitive transistors is supplied through a current limiting resistor 26 to a regulated voltage divider comprising a 4 volt zener diode 36 and a 30 volt zener diode 37.

The entire 34 volts is applied between the collector and the base of transistor 34 through suitable resistors. The collector current limiting resistor is composed of elements 31 and 33 proportioned to apply a suitable driving voltage to the base of transistor 30 when emitter current flows in transistor 34. The emitter of transistor 30 is connected to the junction of diodes 36 and 37 thereby providing a 4 volt reverse bias between it and the base, when no current is flowing in transistor 34.

The control potential for transistors 30 and 34 is obtained from a voltage divider such as that provided by elements 13 and 14 connected across the battery 7 and stored across capacitor 19 as a reference. Capacitor 19 is serially connected with a reference zener diode 29, in this case 7 volts, through the emitter and base terminals of transistor 34.

The battery potential sensing circuit is inoperative until the voltage sample across capacitor 19 reaches a value sufficient to break down the zener diode 29. The sudden surge of base-emitter current in transistor 34 permits current to flow also in the collector circuit. Resistors 31 and 33 are proportioned so that voltage on the base of transistor 30 falls below the 30 volts on the emitter, activating the emitter-base current. Since the emitter voltage set by diode 37 is greater than the voltage at the junction of diode 27 and dropping resistor 24, there is an effective current flow between the two junctions opposing the bias current in resistor 24. The bias on the base of transistor 18 is, therefore, raised as is the emitter collector resistance which forms a part of the RC time constant circuit at the base of transistor 11. The longer delay thus provided reduces the average charging current to the battery 7.

If the potential rise of the battery is merely a transient the zener diode may recover and restore the initial charging rate, thereby saving considerable charging time. On the other hand, if the potential rise is due to an approach to the fully charged condition, there will be a steady increase in bias current from the potential sensing circuit to hold the battery charging current and potential to a safe value.

The following table gives the specifications of the parts used in one embodiment.

*Table A*

| Element | Specification |
|---|---|
| 1 | Switch SPDT 20 amp. Line Voltage. |
| 2 | Line Voltage Rectifier Stack 500 ma. |
| 3 | Line Voltage 20 amp. Fuse. |
| 4 | Silicon Controlled Rectifier C35F. |
| 5 | Ammeter 10 amp. Scale. |
| 6 | Voltmeter 50 volt Scale. |
| 7 | Battery (Ni-Cd) 30 volts. |
| 8 | Resistor 27 ohm ½ watt. |
| 9 | Cartridge fuse ¼ amp. Line Voltage. |
| 10 | Resistor 390 ohms ½ watt. |
| 11 | Unijunction Transistor 2N489. |
| 12 | Resistor 470 ohm ½ watt. |
| 13 | Potentiometer 1K ohm 2 watt. |
| 14 | Resistor 500 ohm ½ watt. |
| 15 | Resistor 10K ohm ½ watt. |
| 16 | Capacitor 0.02 mfd. 50 volt. |
| 17 | Potentiometer 50K ohm ½ watt. |
| 18 | PNP Transistor 2N269. |
| 19 | Capacitor 300 mfd. 50 volt. |
| 20 | Ammeter ma. Scale. |
| 21 | Resistor 1K ohm ½ watt. |
| 22 | Voltmeter 10 volt Scale. |
| 23 | Resistor 3.3K ohm ½ watt. |
| 24 | Resistor 2K ohm ½ watt. |
| 25 | Resistor 2K ohm ½ watt. |
| 26 | Resistor 2.7K ohm 2 watt. |
| 27 | Zener Diode 24 volt. |
| 28 | Normally Closed Button Switch. |
| 29 | Zener Diode 7 volt. |
| 30 | PNP Transistor 2N269. |
| 31 | Resistor 15K ohm ½ watt. |
| 32 | Resistor 10K ohm ½ watt. |
| 33 | Resistor 10K ohm ½ watt. |
| 34 | NPN Transistor 952 or 2N340. |
| 35 | Resistor 1K ohm ½ watt. |
| 36 | Zener Diode 4 volt. |
| 37 | Zener Diode 30 volt. |
| 38 | Source 110-120 v. A.C. 20 amp. |

All resistors are carbon type.

To observe the charging current a meter 5 may be included in series with the battery 7 and rectifier 4. A voltmeter 6 connected across the battery aids in adjusting the voltage pickoff resistor 13, so that the critical potential is not exceeded. A current meter 20 in series with zener diode 29 indicates the operation of the potential sensing circuit and also aids in adjusting potentiometer 13. A voltmeter 22 across capacitor 19 also provides useful information for adjusting the circuit.

Obviously many modifications and variations of the present invention are possible in the light of the above teachings. It is therefore to be understood that within the scope of the appended claims the invention may be practiced otherwise than as specifically described.

What is claimed is:
1. A battery charger comprising;

(a) a pair of input terminals for connection to an alternating current source;

(b) a pair of output charging terminals for connection to a battery;

(c) a silicon controlled rectifier serially connected between said input and output terminals;

(d) a first resistance voltage divider connected serially through a half-wave rectifier to said input terminals;

(e) a first unijunction transistor having its emitter and one base electrode connected at opposite ends of said first voltage divider and its remaining base electrode connected to the control electrode of said silicon controlled rectifier;

(f) a resistance-capacitor charging circuit connected across said first divider and to the emitter of said unijunction transistor to delay each firing of said silicon controlled rectifier, the resistance of said charging circuit including a second series transistor having first and second electrodes in the charging path and a third electrode connected to an intermediate tap in said first voltage divider;

(g) and a transistorized overvoltage trip circuit means with an input coupled to said output charging terminals and an output coupled to said intermediate tap on said first voltage divider to provide a cut-off potential to said series transistor when the voltage of said charging terminals exceeds a preselected safe value.

2. The battery charger according to claim 1 wherein a zener diode is connected in parallel with said first voltage divider.

3. The battery charger according to claim 1 wherein said overvoltage circuit includes a second resistance voltage divider connected in parallel with said first divider, one portion of said second divider including a third series transistor with a control electrode coupled to said output terminals;

(a) second and third zener diodes connected in series shunted across said second voltage divider;

(b) and a fourth transistor having a first electrode coupled to the junction between said second and third zener diodes, a second electrode coupled to an intermediate tap on said second voltage divider and a third electrode coupled to said intermediate tap on said first voltage divider.

4. The battery charger according to claim 3 wherein said control electrode of said third transistor is coupled to said output terminals through a fourth zener diode.

5. The battery charger according to claim 4 wherein a third resistance voltage divider is shunted across said output terminals and said control electrode of said third transistor is coupled to said output terminals through an intermediate tap of said third divider.

References Cited by the Examiner
UNITED STATES PATENTS

| 2,693,568 | 11/54 | Chase | 321—18 |
| 2,806,963 | 9/57 | Woll | 323—22 |
| 3,018,432 | 1/62 | Palmer | 323—22 |

OTHER REFERENCES

General Electric Controlled Rectifier Manual (1st ed., copyright Mar. 21, 1960), pages 85, 86 and 89 relied on.

LLOYD McCOLLUM, *Primary Examiner.*

SAMUEL BERNSTEIN, *Examiner.*